(12) United States Patent
Xiong et al.

(10) Patent No.: US 9,425,614 B2
(45) Date of Patent: Aug. 23, 2016

(54) LIGHTNING PROTECTION RADIO REMOTE UNIT, DISTRIBUTED BASE STATION, LIGHTNING PROTECTION SYSTEM AND METHOD

(71) Applicant: Huawei Technologies Co., Ltd., Shenzhen, Guangdong (CN)

(72) Inventors: Ying Xiong, Shenzhen (CN); Xianghu Qu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 401 days.

(21) Appl. No.: 14/010,323

(22) Filed: Aug. 26, 2013

(65) Prior Publication Data
US 2013/0342949 A1    Dec. 26, 2013

Related U.S. Application Data
(63) Continuation of application No. PCT/CN2011/077850, filed on Aug. 1, 2011.

(51) Int. Cl.
| | |
|---|---|
| *H01C 7/12* | (2006.01) |
| *H02H 1/00* | (2006.01) |
| *H02H 1/04* | (2006.01) |
| *H02H 3/22* | (2006.01) |
| *H02H 9/04* | (2006.01) |
| *H02H 9/06* | (2006.01) |

(52) U.S. Cl.
CPC .. *H02H 9/04* (2013.01); *H02H 9/06* (2013.01)

(58) Field of Classification Search
CPC ................................ H02H 9/04; H01T 4/08
USPC .......................................................... 361/119
See application file for complete search history.

(56) References Cited

U.S. PATENT DOCUMENTS

| 4,264,940 A | 4/1981 | Castle |
| 4,985,800 A | 1/1991 | Feldman et al. |
| 7,612,975 B1 * | 11/2009 | Abraham ................. H02J 1/00 361/111 |

(Continued)

FOREIGN PATENT DOCUMENTS

| CN | 101014160 A | 8/2007 |
| CN | 101877481 A | 11/2010 |

(Continued)

OTHER PUBLICATIONS

International Search Report dated May 10, 2012 in connection with International Patent Application No. PCT/CN2011/077850.

(Continued)

*Primary Examiner* — Dharti Patel

(57) ABSTRACT

Embodiments of the present invention disclose a lightning protection radio remote unit RRU, which includes a primary circuit, a secondary circuit, and a working circuit, where the primary circuit and the secondary circuit are configured to convert a power supply output by a power supply system into a working power supply to power the working circuit; the shield layer located on the RRU side of the shielded cable and the shield layer located on the power supply system side of the shielded cable are grounded respectively; a surge over-voltage withstand capability between the primary circuit and the earth is not less than a lightning over-voltage; a surge over-voltage withstand capability between each inner conductor in the shielded cable and the shield layer of the shielded cable is not less than the lightning over-voltage.

25 Claims, 5 Drawing Sheets

(56) References Cited

U.S. PATENT DOCUMENTS

2005/0099754 A1    5/2005    Hazenboom et al.
2012/0206885 A1    8/2012    Pan et al.

FOREIGN PATENT DOCUMENTS

| CN | 101887776 A | 11/2010 |
| CN | 102044736 A | 5/2011 |
| CN | 201886830 U | 6/2011 |
| WO | WO 2010/145461 A1 | 12/2010 |
| WO | WO 2011/050491 A1 | 5/2011 |

OTHER PUBLICATIONS

"Series K: Protection Against Interference—Protection of radio base stations against lightning discharges", ITU-T, K.56 (Jan. 2010), 22 pages.

* cited by examiner

Distributed base station lightning protection system

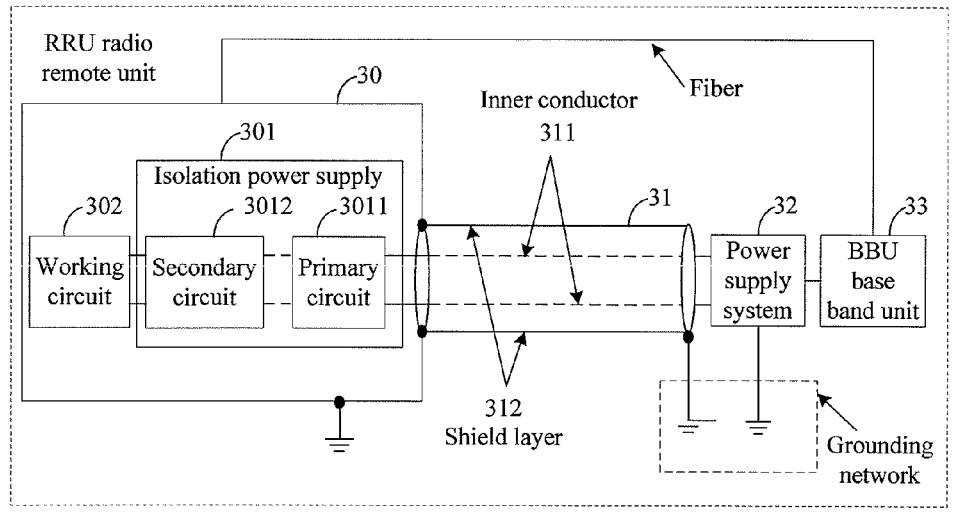

FIG. 8

| Use inner conductors in a shielded cable to receive a power supply rectified and output by a power supply system, and convert the power supply into a working power supply for a working circuit in an RRU through collaboration between a secondary circuit and a primary circuit | S41 |

| Set a surge over-voltage withstand capability between the primary circuit and the earth to a value that is not less than a lightning over-voltage | S42 |

| Ground the shielded cable's shield layer located on the RRU side and the shielded cable's shield layer located on the power supply system side respectively | S43 |

FIG. 9

LIGHTNING PROTECTION RADIO REMOTE UNIT, DISTRIBUTED BASE STATION, LIGHTNING PROTECTION SYSTEM AND METHOD

CROSS-REFERENCE TO RELATED APPLICATIONS

This application is a continuation of International Application No. PCT/CN2011/077850, filed on Aug. 1, 2011, which is hereby incorporated by reference in its entirety.

TECHNICAL FIELD

The present invention relates to the field of communication technologies, and in particular, to a lightning protection radio remote unit, a distributed base station, and a lightning protection system and method.

BACKGROUND

A distributed base station system includes a radio remote unit (RRU, Radio Remote Unit) and a base band unit (BBU, Base band Unit), where the RRU is also called an RRH (Radio Remote Head) in certain contexts. In embodiments of the present invention, the name "RRU" is taken as an example. Referring to FIG. 1, an RRU is generally installed on a tower, connected to an antenna through a feeder, and connected to the tower through a ground line, and therefore, is grounded through the tower. The BBU is located in a remote equipment room (or another similar shelter) under the tower, and is connected to the RRU through a fiber to receive and send signals to be processed.

To supply a direct current to the RRU and the BBU, the base station system needs to be equipped with a power supply system. As shown in FIG. 1, in the prior art, the RRU and the BBU are generally powered by a power supply system (also called a power source system or a primary power supply). Specifically, a direct current power supply output by the power supply system provides power for the RRU on the tower through a shielded cable. The RRU is located on the tower, and the tower is vulnerable to lightning strike. When the tower is struck by lightning, a strong lightning current tends to flow into the RRU through the ground line of the RRU and flow into the power supply system through the shielded cable connected to the RRU to damage the RRU and the power supply system. To prevent the RRU and the power supply system from being damaged by lightning strike on the tower, a lightning protection circuit is generally set on the RRU and the power supply system side in the prior art. FIG. 2 is a schematic diagram of a lightning protection setting on the RRU side in the prior art. A lightning protection component (such as a varistor, a gas discharge tube, a transient suppression diode) is connected between a −48 V signal line and the earth, and between an RTN signal line and the earth, respectively, to meet lightning protection requirements. FIG. 3 is a schematic diagram of a lightning protection setting on the power supply system side in the prior art (assuming that the power supply system here is a rectifier, where the rectifier rectifies an alternating current power supply and outputs a direct current power supply). The positive pole of the rectifier is grounded, and a −48 V signal line and an RTN return line are each connected to a lightning protection component on the ground in a way shown in the figure.

In the process of implementing the present invention, the inventor finds at least the following defects in the prior art:

In the prior art, a lightning protection module is required on both the RRU side and the power supply system side, which requires a certain cost and increases the size of the RRU and the device on the power supply system side.

SUMMARY

Embodiments of the present invention provide a lightning protection radio remote unit and a distributed base station lightning protection system and method to solve the problem in the prior art that a lightning protection module is required on both an RRU side and a power supply system side, which increases costs and device size.

An embodiment of the present invention discloses a lightning protection RRU, which includes a primary circuit, a secondary circuit, and a working circuit, where the primary circuit is configured to receive a power supply from a power supply system through inner conductors in a shielded cable, and the secondary circuit collaborates with the primary circuit to convert the power supply received by the primary circuit into a working power supply, and outputs the working power supply to power the working circuit;

A shield layer located on the RRU side of the shielded cable and the shield layer located on the power supply system side of the shielded cable are grounded respectively;

A surge over-voltage withstand capability between the primary circuit and the earth is not less than a lightning over-voltage;

A surge over-voltage withstand capability between each inner conductor in the shielded cable and the shield layer of the shielded cable is not less than the lightning over-voltage; and The lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

Further, an embodiment of the present invention discloses a distributed base station lightning protection system, including:

a radio remote unit RRU, which includes an isolation power supply and a working circuit, where the isolation power supply is configured to receive a power supply from a power supply system and convert the power supply into a working power supply available to the working circuit; and a shielded cable, which includes inner conductors and a shield layer, where the isolation power supply includes a primary circuit and a secondary circuit, the primary circuit is connected to the inner conductors in the shielded cable and is configured to receive the power supply from the power supply system through the inner conductors in the shielded cable, and the secondary circuit collaborates with the primary circuit to convert the power supply, and outputs the working power supply;

the shield layer located on the RRU side of the shielded cable and the shield layer located on the power supply system side of the shielded cable are grounded respectively;

a surge over-voltage withstand capability between the primary circuit and the earth is not less than a lightning over-voltage;

a surge over-voltage withstand capability between each inner conductor in the shielded cable and the shield layer of the shielded cable is not less than the lightning over-voltage; and the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

Further, an embodiment of the present invention discloses a distributed base station, including:

a radio remote unit RRU, a power supply system, a shielded cable, and a base band unit BBU, where the RRU includes an isolation power supply and a working circuit, where the isolation power supply is configured to receive a power supply from the power supply system and convert the power supply into a working power supply available to the working circuit;

the shielded cable includes inner conductors and a shield layer;

the BBU is connected to the RRU through a fiber to process a base band signal;

the isolation power supply includes a primary circuit and a secondary circuit, the primary circuit is connected to the inner conductors in the shielded cable and is configured to receive the power supply from the power supply system through the inner conductors in the shielded cable, and the secondary circuit collaborates with the primary circuit to convert the power supply, and outputs the working power supply;

the shield layer located on the RRU side of the shielded cable and the shield layer located on the power supply system side of the shielded cable are grounded respectively;

a surge over-voltage withstand capability between the primary circuit and the earth is not less than a lightning over-voltage;

a surge over-voltage withstand capability between each inner conductor in the shielded cable and the shield layer of the shielded cable is not less than the lightning over-voltage; and the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

Further, an embodiment of the present invention discloses a distributed base station lightning protection method, including:

using inner conductors in a shielded cable to receive a power supply rectified and output by a power supply system, and converting the power supply into a working power supply for a working circuit in an RRU through collaboration between a secondary circuit and a primary circuit;

setting a surge over-voltage withstand capability between the primary circuit and the earth to a value that is not less than a lightning over-voltage;

grounding the shield layer located on the RRU side of the shielded cable and the shield layer located on the power supply system side of the shielded cable respectively; and setting a surge over-voltage withstand capability between each inner conductor in the shielded cable and the shield layer of the shielded cable to a value that is not less than the lightning over-voltage, where the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

The above technical solution has the following merits:

Both ends of a shielded cable are grounded, a surge over-voltage withstand capability between a primary circuit and the earth is set to a value that is not less than a lightning over-voltage, and a surge over-voltage withstand capability between each inner conductor in the shielded cable and the shield layer of the shielded cable is also set to a value that is not less than the lightning over-voltage. Therefore, when a tower is struck by lightning, the lightning voltage will not break down an insulation layer between the primary circuit and the earth through a ground line connected to the tower and the RRU, and will not break down an insulation layer between the shield layer and the inner conductor. The lightning current will flow in from the RRU side, pass through the shield layer, and flow out from the side of grounding the shield layer of the power supply system, thereby avoiding damage to circuits on the RRU side and the power supply system side and providing protection against lightning. Moreover, it is not necessary to set a lightning protection module on both sides, which reduces costs and device size.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings show merely some embodiments of the present invention, and persons of ordinary skill in the art may still derive other drawings from these accompanying drawings without creative efforts.

FIG. 8 is a schematic structural diagram of a distributed base station according to Embodiment 3 of the present invention; and FIG. 9 is a flowchart of a distributed base station lightning protection method according to Embodiment 4 of the present invention.

DESCRIPTION OF EMBODIMENTS

To make the objectives, technical solutions, and advantages of the present invention more comprehensible, the following further describes the present invention in detail with reference to specific embodiments and relevant accompanying drawings.

Embodiment 1

Figure 1:
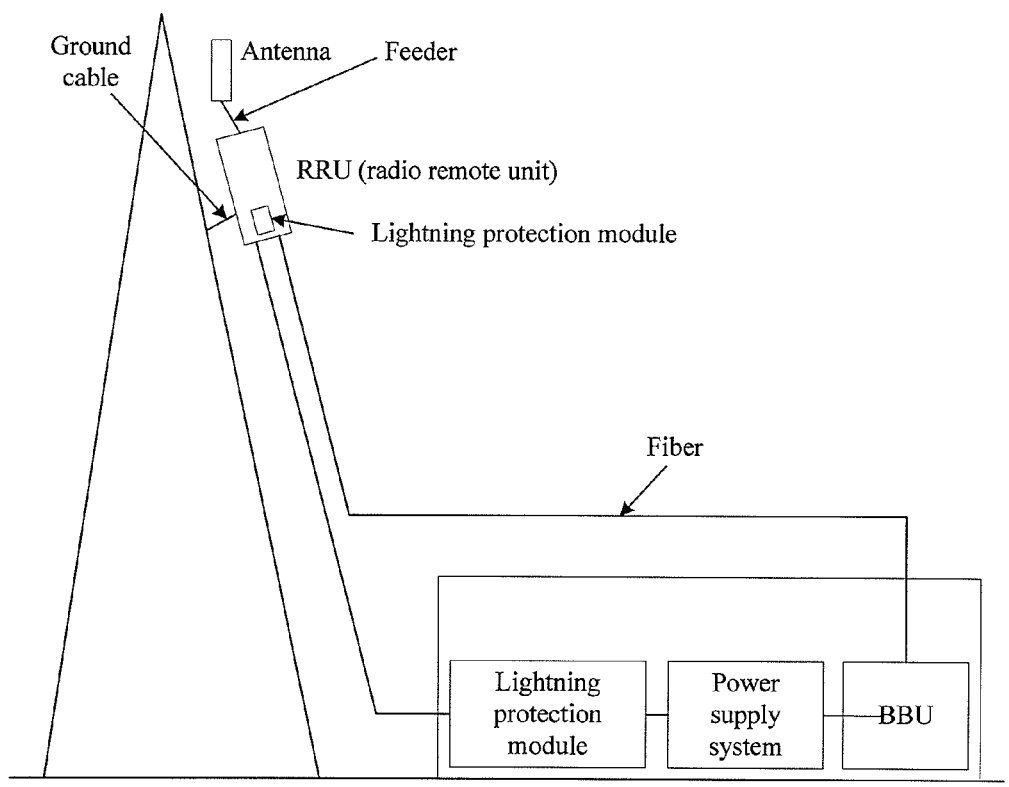
FIG. 1 is a schematic structural diagram of a distributed base station in the prior art.
Figure 2:
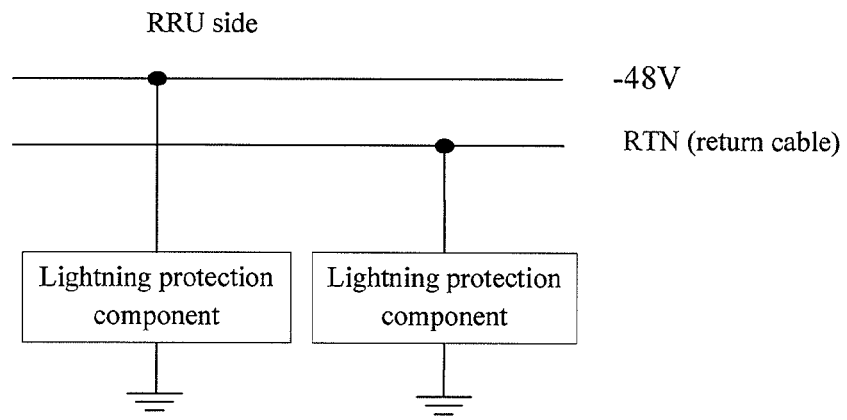
FIG. 2 is a schematic diagram of a lightning protection structure on an RRU side in the prior art.
Figure 3:
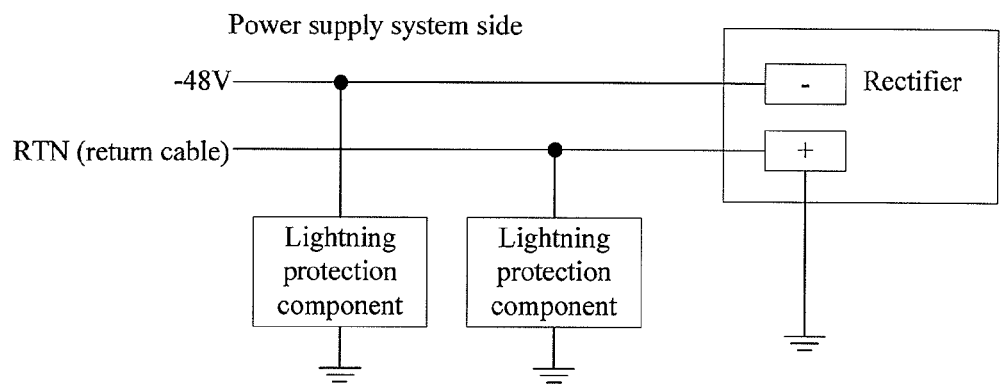
FIG. 3 is a schematic diagram of a lightning protection structure on a power supply system side in the prior art.
Figure 4:
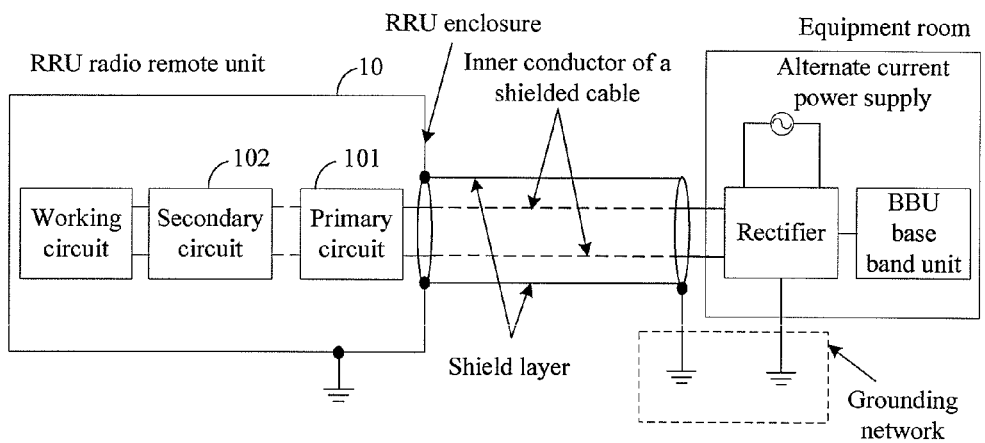
FIG. 4 is a schematic structural diagram of a lightning protection RRU according to Embodiment 1 of the present invention.

Referring to FIG. 4, Embodiment 1 of the present invention provides an RRU (Radio Remote Unit, radio remote unit) 10. The RRU 10 includes a primary circuit 101, a secondary circuit 102, and a working circuit 103, where the primary circuit 101 is configured to receive a power supply from a power supply system through inner conductors in a shielded cable, and the secondary circuit 102 collaborates with the primary circuit 101 to convert the power supply received by the primary circuit 101 into a working power supply, and outputs the working power supply to power the working circuit 103;

The shield layer located on the RRU 10 side of the shielded cable and the shield layer located on the power supply system side of the shielded cable are grounded respectively;

A surge over-voltage withstand capability (surge over-voltage withstand capability) between the primary circuit 101 and the earth is not less than a lightning over-voltage;

A surge over-voltage withstand capability between an inner conductor in the shielded cable and the shield layer of the shielded cable is not less than the lightning over-voltage; and The lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

Specifically, referring to FIG. 4, in the embodiment of the present invention, the RRU includes a primary circuit and a secondary circuit, which are configured to convert a power supply transmitted from a remote end (such as a power supply system on an equipment room side), and then output the power supply to a working circuit (such as a receiver circuit, a power amplifier circuit, a filter circuit, and so on).

Figure 5:
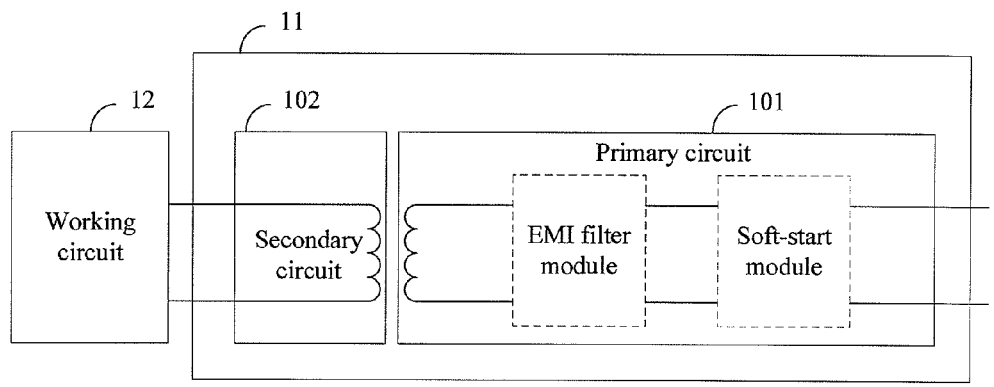
FIG. 5 is a schematic diagram of a lightning protection RRU that uses a transformer to perform power supply conversion according to Embodiment 1 of the present invention.
Figure 6:
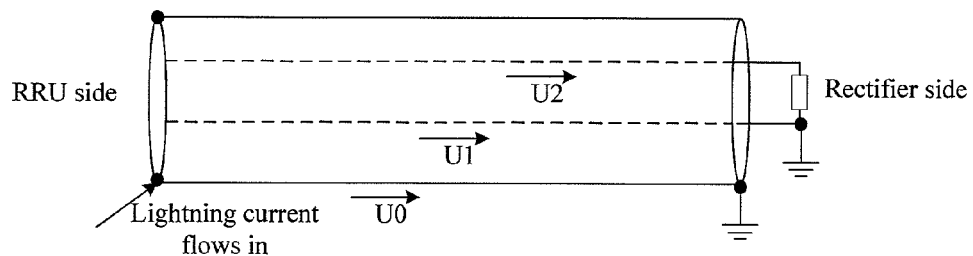
FIG. 6 is a schematic diagram of origination of a lightning over-voltage according to Embodiment 1 of the present invention.

The primary circuit not only receives the power supply output by the power supply system and collaborates in transforming a direct current voltage, but may also include an electromagnetic interference EMI filter circuit, a soft-start circuit, and so on, to achieve better output results. Referring to FIG. 5, the primary circuit and the secondary circuit generally implement voltage transformation through a transformer and implement isolated coupling and output. A circuit on a primary side of the transformer may be regarded as a primary circuit, and a circuit on a secondary side may be regarded as a secondary circuit. In fact, the transformer-based power supply conversion circuit that implements isolated coupling and output may be called "an isolation power supply". The EMI filter module and the soft-start module in FIG. 5 are optional and expressed by dashed boxes.

In practice, when powering the RRU, the remote power supply system generally outputs a direct current power supply through a rectifier. The isolation power supply in the RRU converts the direct current power supply output by the rectifier and then provides the power supply for the RRU. Therefore, the isolation power supply here may be regarded as a DC-DC circuit. The embodiments of the present invention give description primarily based on such a power supply scenario. Therefore, a DC-DC circuit is also used to represent an isolation power supply hereinafter. The detailed implementation of the working circuit and the isolation power supply are well known to persons skilled in the art, and are not detailed here any further.

Compared with the prior art, the embodiment of the present invention removes the lightning protection module in the RRU, and the primary circuit is connected to one end of inner conductors (inner conductors) in the shielded cable (shielded cable, also briefly called "cable" hereinafter). In a common application scenario of an RRU power supply, the pair of inner conductors includes a −48 V inner conductor and an RTN inner conductor (return inner conductor, return inner conductor). The other end of the pair of inner conductors is connected to the output side of the power supply system. Through the inner conductors in the shielded cable, the power supply output by the power supply system is output to the primary circuit in the DC-DC circuit of the RRU. In other power supply scenarios (such as 24 V power supply), the processing is similar to the processing method in the embodiment of the present invention, and is not detailed here any further.

The shielded cable here refers to a cable that has a shield layer and transmits a direct current power supply. In a common RRU power supply scenario, the shielded cable is configured to transmit a direct current power supply output from a power supply system (such as a rectifier). Therefore, the shielded cable here is also called a "shielded DC power cable (shielded DC power cable). A structure of a shielded cable is inner conductors coated with an insulator layer and then coated with a shield layer (metal conductor), and then coated with an insulator layer. Note that some shielded cables need no insulator layer that encloses the outermost of the shield layer. In the embodiment of the present invention, for ease of description, the outermost insulator layer is not specially described or identified. It may be simply understood that the insulator layer does not exist in the embodiment of the present invention. The outermost solid line in the figure may be regarded as a shield layer. For simplicity, the thickness of the shield layer is not shown. The shield layer of another type of shielded cable may be implemented based on a metal tube, that is, the inner conductors are coated with an insulator to form a cable, and then the cable is sheathed in a metal tube. In this case, the metal tube may be regarded as a shield layer of the cable. Such technologies about the shielded cable structure are well known to persons skilled in the art, and are not detailed here any further.

In the embodiment of the present invention, the shield layer on both ends of the shielded cable is grounded, that is, the shield layer located on the RRU side of the shielded cable and the shield layer located on the power supply system side of the shielded cable are grounded respectively. Specifically, to ground the shield layer on the RRU side, the shield layer of the cable may contact the RRU directly (for example, the enclosure of the RRU contacts the shield layer directly), and then get grounded on a ground bar of a tower through a ground line of the RRU; or may be grounded on the ground bar of the tower directly through a ground line in a location near the RRU, or may be grounded by connecting to the tower directly. Also, to ground the shield layer of the cable on the power supply system side, the shield layer may be grounded in a location near the power supply system through a ground line, and share a grounding network (grounding network) with the power supply system, that is, the shield layer and the power supply system are connected to the same grounding network. Specifically, the shield layer of the cable may be connected to a ground bar on the power supply system side first, and grounded uniformly through the ground bar; or, the shield layer may be connected to an underground location, and, under the ground, the earth of the power supply system is connected to the earth of the shield layer uniformly through the ground bar on the power supply system side, and a grounding network is shared.

In the embodiment of the present invention, the surge over-voltage withstand capability between the primary circuit and the earth is not less than a lightning over-voltage, that is, the capability of a signal line in withstanding an over-voltage surging to the earth is not less than a lightning over-voltage, where the signal line is connected to an inner conductor (such as a −48 V inner conductor and an RTN inner conductor) of a cable in the primary circuit; meanwhile, the surge over-voltage withstand capability between each inner conductor in the shielded cable and the shield layer of the shielded cable is not less than the lightning over-voltage either.

The surge over-voltage here refers to a voltage that is caused by the lightning current and reaches a very high transient value, and the surge over-voltage withstand capability refers to a value that measures the capability of withstanding the surge over-voltage. The lightning over-voltage here derives from a product of a shield layer lightning current that flows through the shield layer of the shielded cable and a resistance of the shield layer of the shielded cable, and the shield layer lightning current is determined according to a lightning current compliant with a specific lightning protection level.

The lightning current of nature is not a fixed value. Therefore, in practical engineering application, a lightning over-voltage is set according to a specific lightning protection level. In the embodiment of the present invention, the lightning over-voltage derives from a product of a lightning current that flows through the shield layer of the cable (called a "shield layer lightning current" here) and a resistance of the shield layer of the cable, and may be expressed as:

$$V_T = I \times R \qquad (1)$$

where $V_T$ represents the lightning over-voltage;

I represents the lightning current that flows through the shield layer, and may be determined by a product of a lightning current compliant with a specific lightning protection level and one or more shielding factors:

For example, when the RRU is installed on a tower through a cable tray, the lightning current that flows through the shield layer may be determined by a product of the lightning current ILPL defined by ITU-T k.56 recommendations, a tower shielding factor $\alpha_T$ defined by ITU-T k.56 recommendations, and a cable tray shielding factor $\alpha_F$.

When the lightning protection level is level 1, $I_{LPL}$ may be 200 kA (kA refers to kiloampere);

When the lightning protection level is level 2, $I_{LPL}$ may be 150 kA;

When the lightning protection level is level 3-4, $I_{LPL}$ may be 100 kA;

$\alpha_T$ may be calculated according to geometrical dimensions of the tower and the cable tray (including the shielded cable on the cable tray), and is approximately:

for a round tube tower, $\alpha_T = 0.08$;
for a triangular tower, $\alpha_T = 0.20$;
for a quadrangular tower, $\alpha_T = 0.20$;

$\alpha_F$ may be calculated according to geometrical dimensions of the cable tray and the number of the shielded cables.

For example, an approximate value may be calculated by using the following formula:

$$\alpha_F = 1/(n+9)$$

where n' represents the number of cables in the cable tray.

The values of the above parameters are only reference values under ITU-T k.56 recommendations. In practical application, a similar lightning current of a certain lightning protection level may be selected according to updated standards, or other defined standards, or specific installation environments; or the value of the shielding factor may be changed, or even some shielding factors are added or deleted. The value of the shielding factor may be obtained according to a specific application scenario and an empirical value, or obtained through an experiment. According to the embodiment of the present invention, persons skilled in the art may select a lightning current, and relevant shielding factors that meet practical application requirements and a specific lightning protection level.

R in formula (1) represents a resistance of the shield layer of the cable, and may derive from a product of the resistance ZT per unit length of the shielded cable and the cable length L, that is, $R = Z_T \times L$.

When the RRU installation scenario in the embodiment of the present invention is based on ITU-T k.56 recommendations, considering the shield factor $\alpha_T$ of the tower and the shielding factor $\alpha_F$ of the cable tray and considering that the resistance of the shield layer of the cable derives from a product of the resistance ZT per unit length of the shielded cable and the cable length L, the lightning over-voltage $V_T$ may be expressed as:

$$V_T = I_{LPL} \times \alpha_T \times \alpha_F \times Z_T \times L \qquad (2)$$

The meanings of the parameters in the above formula have been described earlier above, and are not repeated here any further.

The lightning over-voltage $V_T$ is essentially a voltage that causes breakdown between the inner conductor of the direct current shielded cable and the shield layer, and may be specifically obtained according to the following analysis:

Referring to FIG. a, the direct current shielded cable includes two inner conductors, that is, a −48 V inner conductor and an RTN inner conductor that power the RRU respectively. The setting of the RTN inner conductor on the RRU remote side (power supply system side) is the same as that in the prior art. That is, the RTN inner conductor is connected to a positive pole of the power supply system, and the positive pole of the power supply system is connected to the earth. As described earlier above, the shield layer of the cable is also grounded on the power supply system side. Therefore, equivalently, the RTN inner conductor is short-circuited with the shield layer (they are connected together through the earth); besides, on the power supply system side, an impedance exists between the −48 V inner conductor and the RTN inner conductor, and is equal to an equivalent impedance on the direct current power supply output side. On the RRU side, the shield layer is not short-circuited with the −48 V signal line or the RTN signal line in the primary circuit. Therefore, an open circuit may be regarded on the RRU side.

For example, when lightning occurs, the lightning current flows in from an open circuit side (RRU side, left side in the figure) of the shield layer, and flows out from a short circuit side (power supply system side, right side in the figure). Because one side of two inner conductors is open-circuited, the inner conductor conveys no current.

It is assumed that: a voltage fall from the open circuit side to the short circuit side of the shield layer is $U_0$; a voltage fall from the open circuit side to the short circuit side of the RTN inner conductor is $U_1$; a voltage fall from the open circuit side of the −48 V inner conductor to the side connected to an equivalent impedor is $U_2$; the current that flows through the shield layer is $I_0$, the current that flows through the RTN inner conductor is $I_1$, the current that flows through the −48 V inner conductor is $I_2$, the shield layer has a resistance of $R_0$ and a self inductance of $L_0$, the RTN inner conductor has a resistance of $R_1$ and a self inductance of $L_1$; the −48 V inner conductor has a resistance of $R_2$ and a self inductance of $L_2$; (generally the two inner conductors are made of basically the same material and have a basically equal length, and it is appropriate to deem that $R_1=R_2$ and $L_1=L_2$), the mutual inductance between the RTN inner conductor and the shield layer is $M_{01}$; the mutual inductance between the −48 V inner conductor and the shield layer is $M_{02}$; and the mutual inductance between the −48 V inner conductor and the RTN inner conductor is $M_{12}$.

Because the voltage induced on the inner conductor and the voltage on the shield layer have the same direction, the following is deduced:

voltage fall on the shield layer: $U_0=I_0 \times R_0 + j\omega \times L_0 \times I_0 + j\omega \times M_{01} \times I_1 + j\omega \times M_{02} \times I_2$;

voltage fall on the RTN inner conductor: $U_1=I_1 \times R_1 + j\omega \times L_1 \times I_1 + j\omega \times M_{01} \times I_0 + j\omega \times M_{12} \times I_2$;

voltage fall on the −48 V inner conductor: $U_2=I_2 \times R_2 + j\omega \times L_2 \times I_2 + j\omega \times M_{02} \times I_0 + j\omega \times M_{12} \times I_1$.

Because the current on the inner conductor is 0, $I_1=I_2=0$, the above three formulas are simplified as:

voltage fall on the shield layer: $U_0=I_0 \times R_0 + j\omega \times L_0 \times I_0$ voltage fall on the RTN inner conductor: $U_1=j\omega \times M_{01} \times I_0$;

voltage fall on the −48 V inner conductor: $U_2=j\omega \times M_{02} \times I_0$.

Therefore, on the open circuit side, the voltage fall between the inner conductor and the shield layer is:

$\Delta U_{01}=U_0-U_1=I_0 \times R_0 + j\omega \times L_0 \times I_0 - j\omega \times M_{01} \times I_0$;

$\Delta U_{02}=U_0-U_2-48V=I_0 \times R_0 + j\omega \times L_0 \times I_0 - j\omega \times M_{02} \times I_0 - 48V$.

Because the line is a shielded line, when the current flows through the shield layer, all magnetic lines generated by the current in the space surround the inner conductors. Therefore, the mutual inductance between the shield layer and each inner conductor is equal to the self inductance of the shield layer: $L_0=M_{01}=M_{02}$, therefore, $\Delta U_{01}=U_0-U_1=I_0 \times R_0$ \hfill (3)

$\Delta U_{02}=U_0-U_2-48V=I_0 \times R_0-48V$ \hfill (4)

As revealed in the above formula, $\Delta U_{01}$ represents a voltage fall on the shield layer and the RTN inner conductor, and its final result is a product of a current $I_0$ that flows through the shield layer and a resistance $R_0$ of the shield layer. When the $I_0$ is an extreme value current of a certain lightning protection level, the difference represents a breakdown voltage under this level.

$\Delta U_{02}$ represents a voltage fall on the shield layer and the −48 V inner conductor, and its final result is 48 V less than the $\Delta U_{01}$. In the embodiment of the present invention, considering that the maximum voltage in the two voltage differences is $I_0 \times R_0$, the lightning over-voltage is defined as $I_0 \times R_0$ to also meet the $I_0 \times R_0-48V$ requirement. In practical application, considering a margin, a certain number volts (such as hundreds of volts) are added on the basis of formula (1). In this case, the 48 V discrepancy is ignorable.

Not only the surge over-voltage withstand capability between the shield layer and the inner conductor is not less than the lightning over-voltage, but also the surge over-voltage withstand capability between the primary circuit and the earth is not less than the lightning over-voltage. That is because when the RRU is struck by lightning, a voltage difference similar to formula (3) and formula (4) (that is, a voltage difference generated by two signal lines in the primary circuit and the earth, where two signal lines are respectively connected to the −48 V inner conductor of the cable and the RTN inner conductor) is also generated between the primary circuit of the RRU and the earth. To prevent breakdown, the surge over-voltage withstand capability between the primary circuit and the earth needs to be not less than the lightning over-voltage.

In the embodiment of the present invention, the technique of setting the surge over-voltage withstand capability between an inner conductor in the shielded cable and the shield layer to a value not less than the lightning over-voltage is well known to persons skilled in the art, and a proper cable may be selected according to the voltage withstanding characteristic of various shielded cables.

The technique of setting the surge over-voltage withstand capability to a value not less than the lightning over-voltage is also well known to persons skilled in the art. For example, insulation materials may be added to increase the cabling spacing between signal lines in a PCB (Print Circuit Board, printed circuit board) and ensure that the insulation between the primary circuit and the secondary circuit of the transformer withstands a sufficiently high voltage; a capacitor to the earth has a voltage withstand capability compliant with requirements, and so on. Note that when the surge over-voltage withstand capability is set to a value not less than the lightning over-voltage, it is necessary to ensure that the surge over-voltage withstand capability of the primary circuit and the secondary circuit of the DC-DC circuit is not less than the lightning over-voltage either, that is, no lightning strike occurs between the primary circuit and the secondary circuit of the isolation power supply. Otherwise, because the secondary circuit is connected to the working circuit, signals are grounded, and a lightning return is generated through the earth connected to the circuit to damage the circuit when breakdown occurs between the primary circuit and the secondary circuit. Such techniques are well known to persons skilled in the art, and are not detailed here any further.

In the embodiment of the present invention, both ends of a shielded cable are grounded, a surge over-voltage withstand capability between a primary circuit and the earth is set to a value that is not less than a lightning over-voltage, and a surge over-voltage withstand capability between each inner conductor in the shielded cable and the shield layer of the shielded cable is also set to a value that is not less than the lightning over-voltage. Therefore, when a tower is struck by lightning, the lightning voltage will not break down an insulation layer between the primary circuit and the earth through a ground line connected to the tower and the RRU, and will not break down an insulation layer between the shield layer and the inner conductor. The lightning current will flow in from the RRU side, pass through the shield layer, and flow out from the side of grounding the shield layer of the power supply system, thereby avoiding damage to circuits on the RRU side and the power supply system side and providing protection against lightning.

With the embodiment of the present invention, it is not necessary to set a lightning protection module on both the RRU side and the power supply system side, which reduces costs and size. Note that the lightning protection module on the power supply system side may also be retained to keep rather than change the engineering installation habit already formed under the existing technical conditions.

Besides, as analyzed above, on the RRU side, the shield layer is not short-circuited with the −48 V signal line or the RTN signal line in the primary circuit. Therefore, an open circuit may be regarded on the RRU side. That is, no current flows through the inner conductor. Compared with the lightning protection design in the prior art which still lets current flow through the inner conductor, the embodiment of the present invention enhances the lightning protection effect.

Besides, the embodiment of the present invention further gives formulas for calculating the lightning over-voltage. Persons skilled in the art may implement the embodiment of the present invention according to the existing application scenario and certain parameters defined in the standard so that the embodiment of the present invention is of more engineering significance.

Note that the above embodiment is based on a common RRU power supply scenario. Persons skilled in the art may implement the lightning protection design for other similar RRU power supply scenarios according to the above embodiment.

Embodiment 2

Figure 7:
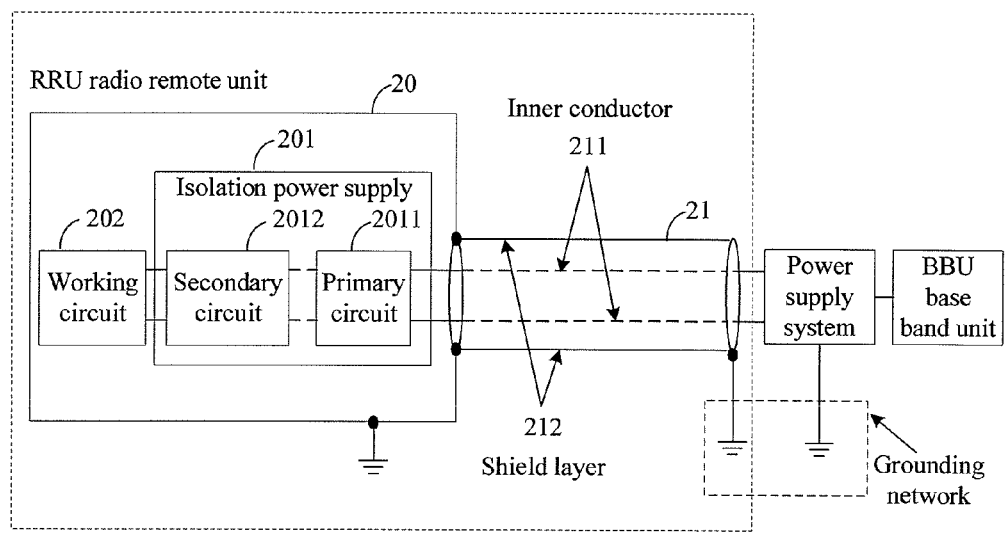
FIG. 7 is a schematic structural diagram of a lightning protection system according to Embodiment 2 of the present invention.

Referring to FIG. 7, based on Embodiment 1, an embodiment of the present invention provides a distributed base station lightning protection system, including:
 a radio remote unit RRU 20 (or also called a radio remote head RRH), which includes an isolation power supply 201 and a working circuit 202, where the isolation power supply 201 is configured to receive a power supply from a power supply system and convert the power supply into a working power supply available to the working circuit; and
 a shielded cable 21, which includes inner conductors 211 and a shield layer 212, where
 the isolation power supply 201 includes a primary circuit 2011 and a secondary circuit 2012, the primary circuit is connected to the inner conductors in the shielded cable and is configured to receive the power supply from the power supply system through the inner conductors in the shielded cable, and the secondary circuit collaborates with the primary circuit to convert the power supply, and outputs the working power supply;
 the shield layer located on the RRU side of the shielded cable and the shield layer located on the power supply system side of the shielded cable are grounded respectively;
 a surge over-voltage withstand capability between the primary circuit and the earth is not less than a lightning over-voltage;
 a surge over-voltage withstand capability between each inner conductor in the shielded cable and the shield layer of the shielded cable is not less than the lightning over-voltage; and
 the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

When the RRU is installed on a tower through a cable tray, the shield layer lightning current is determined by a product of the lightning current ILPL defined by ITU-T k.56 recommendations, a tower shielding factor $\alpha_T$ defined by ITU-T k.56 recommendations, and a cable tray shielding factor $\alpha_F$.

The resistance of the shield layer of the shielded cable is determined by a product of the resistance per unit length of the shielded cable and the length of the shielded direct current cable.

The shield layer located on the power supply system side of the shielded cable and the power supply system are connected to the same grounding network.

In the embodiment of the present invention, for the specific setting and working principles of each circuit, see Embodiment 1. No repeated description is given here any further.

With the embodiment of the present invention, it is not necessary to set a lightning protection module on both the RRU side and the power supply system side, which reduces costs and size. In addition, the embodiment of the present invention enhances the lightning protection strength and engineering practice significance, which has been described in Embodiment 1, and no repeated description is given here any further.

Embodiment 3

Referring to FIG. 8, based on Embodiment 1, an embodiment of the present invention provides a distributed base station, including:
 a radio remote unit RRU 30, a shielded cable 31, a power supply system 32, and a base band unit BBU 33, where
 the RRU includes an isolation power supply 301 and a working circuit 302, where the isolation power supply 301 is configured to receive a power supply from the power supply system 32 and convert the power supply into a working power supply available to the working circuit 302;
 the shielded cable 31 includes inner conductors 311 and a shield layer 312;
 the BBU 30 is connected to the RRU 30 through a fiber to process a base band signal, where the BBU may be an existing BBU, and its working mode is the same as the prior art and is not repeated here any further;
 the isolation power supply includes a primary circuit and a secondary circuit, the primary circuit is connected to the inner conductors in the shielded cable and is configured to receive the power supply from the power supply system through the inner conductors in the shielded cable, and the secondary circuit collaborates with the primary circuit to convert the power supply, and outputs the working power supply;
 the shield layer located on the RRU side of the shielded cable and the shield layer located on the power supply system side of the shielded cable are grounded respectively;
 a surge over-voltage withstand capability between the primary circuit and the earth is not less than a lightning over-voltage;
 a surge over-voltage withstand capability between each inner conductor in the shielded cable and the shield layer of the shielded cable is not less than the lightning over-voltage; and
 the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

With the embodiment of the present invention, it is not necessary to set a lightning protection module on both the RRU side and the power supply system side, which reduces costs and size. In addition, the embodiment of the present invention enhances the lightning protection strength and engineering practice significance, which has been described in Embodiment 1, and no repeated description is given here any further.

Embodiment 4

Referring to FIG. 9, based on Embodiment 1, an embodiment of the present invention provides a distributed base station lightning protection method, which includes the following steps:

S41. Use inner conductors in a shielded cable to receive a power supply rectified and output by a power supply system, and convert the power supply into a working power supply for a working circuit in an RRU through collaboration between a secondary circuit and a primary circuit.

S42. Set a surge over-voltage withstand capability between the primary circuit and the earth to a value that is not less than a lightning over-voltage.

S43. Ground the shield layer located on the RRU side of the shielded cable and the shield layer located on the power supply system side of the shielded cable respectively.

A surge over-voltage withstand capability between each inner conductor in the shielded cable and the shield layer of the shielded cable is set to a value that is not less than the lightning over-voltage, where the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

With the embodiment of the present invention, it is not necessary to set a lightning protection module on both the RRU side and the power supply system side, which reduces costs and size. In addition, the embodiment of the present invention enhances the lightning protection strength and engineering practice significance, which has been described in Embodiment 1, and no repeated description is given here any further.

The foregoing exemplary embodiments describe the objectives, technical solutions, and advantages of the present invention in detail. It should be understood that the foregoing descriptions are merely the exemplary embodiments of the present invention. However, the scope of the present invention is not limited thereto. All modifications, equivalent replacements, and improvements made within the spirit and principle of the present invention shall fall within the scope of the present invention.

What is claimed is:

1. A lightning protection radio remote unit (RRU), comprising:
a primary circuit;
a secondary circuit coupled to the primary circuit; and
a working circuit coupled to the secondary circuit;
wherein the primary circuit is configured to receive a power supply from a power supply system through inner conductors in a shielded cable, the shielded cable comprising a shield layer, and the secondary circuit collaborates with the primary circuit to convert the power supply received by the primary circuit into a working power supply and outputs the working power supply to power the working circuit,
the shield layer located on the RRU side of the shielded cable and the shield layer located on the power supply system side of the shielded cable are grounded respectively,
a surge over-voltage withstand capability between the primary circuit and the earth is not less than a lightning over-voltage,
a surge over-voltage withstand capability between each inner conductor in the shielded cable and the shield layer of the shielded cable is not less than the lightning over-voltage, and
the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

2. The RRU according to claim 1, wherein:
when the RRU is installed on a tower through a cable tray, the shield layer lightning current is determined by a product of a lightning current ILPL defined by ITU-T k.56 recommendations, a tower shielding factor $\alpha_T$ defined by ITU-T k.56 recommendations, and a cable tray shielding factor $\alpha_F$.

3. The RRU according to claim 1, wherein:
the resistance of the shield layer of the shielded cable is determined by a product of a resistance per unit length of the shielded cable and a length of the shielded direct current cable.

4. The RRU according to claim 1, wherein:
the shield layer located on the power supply system side of the shielded cable and the power supply system are connected to a same grounding network.

5. A distributed base station lightning protection system, comprising:
a radio remote unit (RRU) comprising an isolation power supply and a working circuit, wherein the isolation power supply is configured to receive a power supply from a power supply system and convert the power supply into a working power supply available to the working circuit; and
a shielded cable comprising inner conductors and a shield layer, wherein
the isolation power supply comprises a primary circuit and a secondary circuit, the primary circuit is connected to the inner conductors in the shielded cable and is configured to receive the power supply from the power supply system through the inner conductors in the shielded cable, and the secondary circuit collaborates with the primary circuit to convert the power supply, and outputs the working power supply;
the shield layer located on the RRU side of the shielded cable and the shield layer located on the power supply system side of the shielded cable are grounded respectively;
a surge over-voltage withstand capability between the primary circuit and the earth is not less than a lightning over-voltage;
a surge over-voltage withstand capability between each inner conductor in the shielded cable and the shield layer of the shielded cable is not less than the lightning over-voltage; and
the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

6. The lightning protection system according to claim 5, wherein:
when the RRU is installed on a tower through a cable tray, the shield layer lightning current is determined by a product of a lightning current ILPL defined by ITU-T k.56 recommendations, a tower shielding factor $\alpha_T$ defined by ITU-T k.56 recommendations, and a cable tray shielding factor $\alpha_F$.

7. The lightning protection system according to claim 5, wherein:
the resistance of the shield layer of the shielded cable is determined by a product of a resistance per unit length of the shielded cable and a length of the shielded direct current cable.

8. The lightning protection system according to claim 5, wherein:
the shield layer located on the power supply system side of the shielded cable and the power supply system are connected to a same grounding network.

9. A distributed base station, comprising:
a radio remote unit (RRU), wherein the RRU comprises an isolation power supply and a working circuit, wherein the isolation power supply is configured to receive a power supply from a power supply system and convert the power supply into a working power supply available to the working circuit,
a shielded cable comprising inner conductors and a shield layer,
a power supply system, and
a base band unit (BBU), wherein the BBU is connected to the RRU through a fiber to process a base band signal,
the isolation power supply comprises a primary circuit and a secondary circuit, the primary circuit is connected to the inner conductors in the shielded cable and is configured to receive the power supply from the power supply system through the inner conductors in the shielded cable, and the secondary circuit collaborates with the primary circuit to convert the power supply, and outputs the working power supply;
the shield layer located on the RRU side of the shielded cable and the shield layer located on the power supply system side of the shielded cable are grounded respectively;
a surge over-voltage withstand capability between the primary circuit and the earth is not less than a lightning over-voltage;
a surge over-voltage withstand capability between each inner conductor in the shielded cable and the shield layer of the shielded cable is not less than the lightning over-voltage; and
the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

10. The base station according to claim 9, wherein:
when the RRU is installed on a tower through a cable tray, the shield layer lightning current is determined by a product of a lightning current ILPL defined by ITU-T k.56 recommendations, a tower shielding factor $\alpha_T$ defined by ITU-T k.56 recommendations, and a cable tray shielding factor $\alpha_F$.

11. The base station according to claim 9, wherein:
the resistance of the shield layer of the shielded cable is determined by a product of a resistance per unit length of the shielded cable and a length of the shielded direct current cable.

12. The base station according to claim 9, wherein:
the shield layer located on the power supply system side of the shielded cable and the power supply system are connected to a same grounding network.

13. A distributed base station lightning protection method, comprising:
using inner conductors in a shielded cable to receive a power supply rectified and output by a power supply system, and converting the power supply into a working power supply for a working circuit in an RRU through collaboration between a secondary circuit and a primary circuit;
setting a surge over-voltage withstand capability between the primary circuit and the earth to a value that is not less than a lightning over-voltage;
grounding the shield layer located on the RRU side of the shielded cable and the shield layer located on the power supply system side of the shielded cable respectively; and
setting a surge over-voltage withstand capability between each inner conductor in the shielded cable and the shield layer of the shielded cable to a value that is not less than the lightning over-voltage, wherein the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

14. The method according to claim 13, wherein:
when the RRU is installed on a tower through a cable tray, the shield layer lightning current is determined by a product of a lightning current ILPL defined by ITU-T k.56 recommendations, a tower shielding factor $\alpha_T$ defined by ITU-T k.56 recommendations, and a cable tray shielding factor $\alpha_F$.

15. The method according to claim 13, wherein:
the resistance of the shield layer of the shielded cable is determined by a product of a resistance per unit length of the shielded cable and a length of the shielded direct current cable.

16. The method according to claim 13, further comprising:
connecting the shield layer located on the power supply system side of the shielded cable and the power supply system to a same grounding network.

17. A lightning protection radio remote unit (RRU), comprising:
a primary circuit configured to receive a power supply from a power supply system through inner conductors in a shielded cable, the shielded cable comprising a shield layer;
a secondary circuit coupled to the primary circuit, wherein the secondary circuit collaborates with the primary circuit to convert the power supply received by the primary circuit into a working power supply; and
a working circuit coupled to the secondary circuit;
wherein the secondary circuit outputs the working power supply to power the working circuit, and
wherein a surge over-voltage withstand capability between the primary circuit and the earth is not less than a lightning over-voltage.

18. The RRU according to claim 17, wherein:
when the RRU is installed on a tower through a cable tray, a shield layer lightning current is determined by a product of a lightning current ILPL defined by ITU-T k.56 recommendations, a tower shielding factor $\alpha_T$ defined by ITU-T k.56 recommendations, and a cable tray shielding factor $\alpha_F$.

19. The RRU according to claim 17, wherein:
the shield layer located on the RRU side of the shielded cable is grounded.

20. The RRU according to claim 17, wherein:
the shield layer located on the power supply system side of the shielded cable is grounded.

21. The RRU according to claim 20, wherein:
the shield layer located on the power supply system side of the shielded cable and the power supply system are connected to a same grounding network.

22. The RRU according to claim 17, wherein:
the shield layer located on the RRU side of the shielded cable and the shield layer located on the power supply system side of the shielded cable are grounded respectively.

23. The RRU according to claim 17, wherein:
a surge over-voltage withstand capability between each inner conductor in the shielded cable and the shield layer of the shielded cable is not less than the lightning over-voltage.

24. The RRU according to claim 17, wherein:
the lightning over-voltage derives from a product of a shield layer lightning current that flows through the shield layer of the shielded cable and a resistance of the shield layer of the shielded cable, and the shield layer lightning current is determined according to a lightning current compliant with a specific lightning protection level.

25. The RRU according to claim 24, wherein:
the resistance of the shield layer of the shielded cable is determined by a product of a resistance per unit length of the shielded cable and a length of the shielded direct current cable.

* * * * *